United States Patent Office 3,487,034
Patented Dec. 30, 1969

3,487,034
ALKYD RESINS AND THEIR PREPARATION FROM REACTION MIXTURES COMPRISING AN ALPHA, ALPHA-DIMETHYLOL MONOCARBOXYLIC ACID
Panayotis D. Mallios, New Haven, Conn., assignor to A. E. Staley Manufacturing Company, Decatur, Ill., a corporation of Delaware
No Drawing. Filed May 16, 1966, Ser. No. 550,100
Int. Cl. C08g 17/16
U.S. Cl. 260—22         3 Claims

ABSTRACT OF THE DISCLOSURE

A film-forming water-soluble alkyd comprising esterified units of (A) polyhydric alcohol free of carboxylic acid group, (B) polyhydric alcohol containing one free carboxylic acid group, (C) ethylenically unsaturated fatty acid of at least ten carbon atoms and (D) polycarboxylic acid wherein said polycarboxylic acid comprises adduct of alpha, beta-ethylenically unsaturated dicarboxylic acid and ethylenically unsaturated fatty acid of at least ten carbon atoms.

---

This invention relates to a film forming water-soluble alkyd. More particularly this invention relates to a film forming water-soluble alkyd comprising esterified units of (A) polyhydric alcohol free of carboxylic acid group, (B) polyhydric alcohol containing one free carboxylic acid group, (C) ethylenically unsaturated fatty acid of at least ten carbon atoms and (D) polycarboxylic acid wherein said polycarboxylic acid comprises adduct of alpha, beta-ethylenically unsaturated dicarboxylic acid and ethylenically unsaturated fatty acid of at least ten carbon atoms.

As is well known, paints are composed of a solid (the pigment) and liquid "vehicle," which normally consists of a film forming binder and volatile solvent. In recent years water has become the preferred volatile solvent because of the higher cost, hazards, (flammability and toxicity) and objectionable odor of organic solvents. Almost all water-based paints on the market today are based on aqueous emulsion polymer vehicles, such as those resulting from emulsion polymerization of (meth)acrylate and vinyl acetate. While these water-based emulsion polymer paints have many desirable properties, they normally exhibit relatively poor gloss and have poor wet edge. The poor wet edge of emulsion polymer paints is due to the fact that film formation is quite rapid taking place by coalescence and subsequent fusion of "soft" polymer particles. As a result of the wet edge properties of latex paints, care must be exercised in their use in order to prevent the formation of aesthetically undesirable lap marks on walls, etc.

Other water-based paints have been introduced with less success. Most of these contain a so-called water-soluble alkyd and minor amounts of an organic cosolvent or coupling solvent. Paints based on these polymers have markedly better wet edge properties than paints based on aqueous emulsion polymers. This is due to the fact that film formation is accomplished through a prolonged oxidative cross-linking of the relatively low molecular weight alkyd. Further, these water-soluble alkyd systems exhibit better leveling, gloss and substrate adhesion than the emulsion-type products. However, paints based on the water-soluble alkyds yellow excessively and have high tack much like the conventional alkyd paints applied from solely an organic solvent. In addition water-soluble alkyd based paints exhibit poor water-resistance until fully cured.

The general object of this invention is to provide a new water-soluble alkyd resin. Another object of this invention is to provide a water-soluble alkyd resin having excellent non-yellowing properties. A further object of this invention is to provide a water-soluble alkyd having good water-resistance. Other objects will appear hereinafter.

I have now found that the objects of this invention can be attained by providing a film forming water-soluble alkyd comprising esterified units of (A) polyhydric alcohol free of carboxylic acid group, (B) polyhydric alcohol containing one free carboxylic acid group, (C) ethylenically unsaturated fatty acid of at least ten carbon atoms and (D) polycarboxylic acid wherein said polycarboxylic acid comprises adduct of alpha, beta-ethylenically unsaturated dicarboxylic acid and ethylenically unsaturated fatty acid of at least ten carbon atoms.

The term "water-soluble alkyd" is used in the manner which is common in this art to refer to alkyds which are capable of forming a clear homogeneous system in water at an alkaline pH usually in the presence of a suitable concentration of an organic cosolvent or coupling solvent.

While the water-soluble alkyds of this invention can be prepared by a variety of techniques, such as by condensing together all of the alkyd forming components (A), (B), (C), and (D), best results have been obtained by forming or providing an ester of ethylenically unsaturated fatty acid of at least ten carbon atoms and polyhydric alcohol free of carboxylic acid group, said ester having on an average at least one free hydroxyl group per molecule and reacting said partial ester with polyhydric alcohol containing one free carboxylic acid group and polycarboxylic acid, wherein said polycarboxylic acid comprises an alpha, beta-ethylenically unsaturated dicarboxylic acid or compound capable of forming an alpha, beta-ethylenically unsaturated dicarboxylic acid. This reaction is carried out under conditions wherein there is both esterification and adduct formation.

The partial ester may be prepared by any of the well-known techniques of esterification. For example, free ethylenically unsaturated fatty acids such as may be obtained by hydrolysis of drying oil or oils containing drying oil acids may be reacted with one or more polyhydroxy compounds containing two or more hydroxyl groups in such proportion as to provide on an average at least one free hydroxyl group in each molecule of the resultant polyhydric alcohol-ethylenically unsaturated fatty acid ester and preferably on an average at least one and one-half free hydroxyl per molecule.

A more common procedure in preparing esters of ethylenically unsaturated fatty acids is to partially alcoholize a drying oil such as linseed oil or soybean oil with a polyhydric alcohol such as glycerol. In the event that glycerol is employed as the polyhydric alcohol for alcoholysis of the drying oil diglycerides and monoglycerides are formed in substantial quantities. Of course, when conventional oils are employed in the alcoholysis reaction, there will be considerable variation in the structure of the products. In most instances, however, many of the acid groups of at least ten carbon atoms will contain a plurality of double bonds. It may also be that some monoglycerides are formed having only saturated fatty acid groups and ordinarily there will be some unchanged polyhydric alcohol and unchanged glycerides remaining in the mixture. However, a majority of the ester molecules contain both free-hydroxyl groups and ethylenically unsaturated fatty acid moieties of at least ten carbon atoms.

Any polyhydric alcohol may be employed in preparing the esters of ethylenically unsaturated fatty acids. Preferably, the polyhydric alcohol contains from about 3 to 6 hydroxyl groups per molecule. Examples of polyhydric alcohols which may be used in this invention include ethylene glycol, diethylene glycol, triethylene glycol, propylene glycol, decaethylene glycol, glycerol, pentaerythritol, 1,1,1-trimethylolethane, 1,1,1-trimethylolpropane, sorbitol, tetramethylolcylohexanol, alpha-methyl glucoside, polyol glycosides, erythritol, dipentaerythritol, polyallyl alcohol (such as RJ–100, which is a copolymer of allyl alcohol and styrene), etc. as well as mixtures of two or more of the above polyhydric alcohols. These may be employed either to esterify the fatty acids or to alcoholize the triglycerides of the acids by ester interchange.

The ethylenically unsaturated carboxylic acids of at least ten carbon atoms in the form of free acids, or their glycerides, include the acids of substantially any of the glyceride oils recognized as having drying oil properties. The acids of so-called semi-drying oils are also included in the term drying oil acids and partial esters of this class (drying oil acid esters) are preferred. These partial esters of drying oil acids contain at least some polyunsaturated fatty acid chains as well as some saturated carboxylic acids, such as oleic acids. It is to be understood that concentrates of unsaturated acids such as linoleic acid and linolenic acid, which may be obtained by distillation operations in well-known manner, may also be employed in the preparation of the base partial esters. Convenient sources of these various acids are drying and semi-drying oils, such as linseed oil, cottonseed oil, safflower oil, soybean oil, tung oil, oiticica oil, menhaden oil, dehydrated castor oil, sardine oil, etc. Soap stocks and foots acids from the refining of these oils are also suitable sources of ethylenically unsaturated fatty acids of at least 10 carbon atoms which may be utilized in the process of this invention.

When the esters of ethylenically unsaturated fatty acids and polyhydric alcohol are prepared by alcoholysis of a glyceride oil in the manner previously referred to, the technique commonly employed in the preparation of esters for the modification of alkyd resins may be utilized. Such alcoholysis involves the heating of oil with the desired proportion of polyhydric alcohol in order to obtain a partial ester containing the desired number of free-hydroxyl groups. The reaction is usually conducted in the presence of an alcoholysis catalyst such as litharge, litthium ricinoleate, etc. It is also convenient to blanket the reaction with an inert gas, such as nitrogen, designed to prevent oxidation of the double bonds of the hydrocarbon portions of the acid. The alcoholysis reaction may be conducted at a temperature in a range of about 150° to 300° C. or higher for purposes of the present invention. In general the mole ratios of fatty acid and polyhydric alcohol or alcohols are selected to provide preferably on an average at least about 1.5 hydroxyl groups per molecule of partial ester. The resultant partial ester comprises from about 30 to 80% by weight of the final alkyd, preferably about 45 to 75% by weight.

As indicated above, the partial ester is reacted with a mixture of polyhydric alcohol containing one free carboxylic acid group and polycarboxylic acid compound comprising at least 5 mole percent of an alpha, beta-ethylenically unsaturated dicarboxylic acid or monohydroxy polycarboxylic acid capable of providing said acid. In order to impart the necessary properties to the water-soluble alkyd, the polyhydric alcohol containing one free carboxyl is used in a concentration of 0.1 to 1.0 mole (preferably 0.2 to 0.6 mole) per equivalent of fatty acid in the partial ester and the polycarboxylic acid is used in a concentration of from 1 to 4 equivalents (preferably 1.5 to 3 equivalents) per equivalent of fatty acid in the partial ester. In this way, there is incorporated a relatively uniform distribution of free carboxylic acid groups on the hydrophobic fatty acid chains and along the resin backbone, which results in improved water-resistance and less need for undesirable coupling solvents.

Suitable polyhydric alcohols containing a free carboxylic acid group are the alpha, alpha-di(methylol)-monocarboxylic acids which conform to the structure:

$$R-\underset{\underset{CH_2OH}{|}}{\overset{\overset{CH_2OH}{|}}{C}}-COOH$$

wherein R is hydrogen or a hydrocarbyl radical of 1 to 16 carbon atoms, such as methyl, ethyl, palmityl, etc. The configuration of these polyhydric alcohols is such that under polycondensation reaction conditions the free carboxyl groups are sterically hindered and do not readily take part in the esterification reaction. Accordingly, the main chain of the final polyester or alkyd contains randomly distributed internal free carboxylic acid groups which impart water-solubility to the alkyd. This random and more even distribution of free carboxylic acid groups along the polyester backbone appears to result in both improved solubility of the alkyd in paint compositions and to improved water resistance of the applied paints. Best results have been obtained with dimethylolpropionic acid, which is the preferred polyhydric alcohol containing one free carboxylic acid group. Other things being equal, applied coatings based on alkyds containing dimethylolpropionic acid and the preferred alpha, beta-ethylenically unsaturated dicarboxylic acid moieties (maleic) do not yellow as much as other alkyd coatings.

Suitable polycarboxylic acids for use in this invention include the alpha, beta-ethylenically unsaturated dicarboxylic acids, such as maleic acid, maleic anhydride, fumaric acid, itaconic acid, itaconic anhydride, mesaconic acid, citraconic acid, chloromaleic acid, ethyl maleic acid, etc.; polycarboxylic acids capable of forming alpha, beta-ethylenically unsaturated dicarboxylic acids on heating, such as maleic acid or citric acid; and saturated (i.e. non-ethylenically unsaturated) polycarboxylic acids such as phthalic acid, phthalic anhydride, terephthalic acid, isophthalic acid, adipic acid, sebacic acid, trimellitic acid, trimellitic anhydride, hemimellitic acid, etc.

In accordance with the provisions of this invention a portion of the alpha, beta-ethylenically unsaturated dicarboxylic acid (maleic acid or maleic anhydride) and/or polycarboxylic acid capable of forming alpha, beta-ethylenically unsaturated dicarboxylic acid forms an adduct with the aforementioned esters of ethylenically unsaturated fatty acids and polyhydric alcohol. The ethylenic group of the dicarboxylic acid adds to a hydrogen atom alpha to an ethylenic group in the fatty acid moiety of the partial ester. In this adduct reaction, the ethylenic group of the alpha, beta-ethylenically unsaturated dicarboxylic acid becomes saturated while the double bond or double bonds of the esterified fatty acid moiety remain unsaturated. In the event that the fatty acid moiety contains conjugated ethylenically unsaturated double bonds (such as in eleostearic acid) or fatty acid moieties capable of isomerization under the reaction conditions to give conjugation, a Diels-Alder type adduct reaction also occurs. These "adduct reactions" may be considered to be addition reactions since no water is split off as a result of adduct formation. It is, of course, obvious that the hydrophobic chain of the fatty acid has been rendered relatively hydrophilic by the two free carboxyl functions now present in the adduct.

Subsequently, on an average at least about one of the free carboxyl groups on the adduct, reacts through polyesterification to form a side chain that contributes some hydrophilic character to the fatty acid chain portion of the adduct but less than that which is contributed by a free carboxyl group. It is believed that this esterification of one of the free carboxyl groups furnished by the alpha, beta-ethylenically unsaturated dicarboxylic acid to the adduct eliminates the adverse effects on the water-resistance of applied coatings, caused by the presence of free carboxyl groups on vicinal (alpha,beta) or alpha, gamma carbon atoms.

As pointed out above, the alpha, beta-ethylenically unsaturated dicarboxylic acid should comprise at least five mole percent of the polycarboxylic acids employed in order to impart the necessary properties to the final alkyd. If less than five mole percent is employed, the final product will be deficient in one or more properties. The higher the concentration of alpha, beta-ethylenically unsaturated dicarboxylic acid, the greater the water-solubility of the final alkyd and the lower the concentration of cosolvent needed to dissolve the alkyd. It is, of course, clear that it is desirable to employ the lowest concentration of cosolvent possible.

Regardless of the concentration of alpha, beta-ethylenically unsaturated dicarboxylic acid employed, a certain portion will not react with fatty acid moieties and will only react as difunctional esterification reagents. In general the higher the concentration of alpha, beta-ethylenically unsaturated dicarboxylic acid employed, the higher the percentage of said acid which behaves only as a polyesterifying agent. However, in order to insure that sufficient polyesterifying reagent is present it is desirable to provide one of the aforementioned saturated polycarboxylic acids, preferably phthalic acid or its anhydride, in a concentration of 25–95 mole percent of the polyfunctional acids employed.

In general best results have been obtained with maleic anhydride and/or maleic acid (which forms the anhydride on heating) as the alpha, beta-ethylenically unsaturated dicarboxylic acid. Alkyds prepared with these acids have better color than alkyds produced without same. Other things being equal, an alkyd prepared with the aforesaid acids have a Gardner color of 2 as opposed to about 6.

In somewhat greater detail the alkyd resin of this invention is preferably prepared by reacting together (1) the partial ester of ethylenically unsaturated fatty acid and polyhydric alcohol, (2) polyhydric alcohol containing one free carboxylic acid group and (3) polycarboxylic acid comprising at least five mole percent of alpha, beta-ethylenically unsaturated dicarboxylic acid and/or monohydroxypolycarboxylic acid capable of forming alpha, beta-ethylenically unsaturated dicarboxylic acid. The reaction is carried out at about 150–300° C. under conditions simultaneously promoting adduct formation and polyesterification, preferably in the absence of diluents since diluents tend to inhibit or reduce the extent or rate of adduct formation. The reactants are maintained at this temperature until water ceases to evolve from the condensation reaction; until the alkyd reaches a predetermined viscosity as determined by standard viscosity tests or until the alkyd reaches a predetermined acid number. Generally, it is desirable to terminate the reaction when the alkyd reaches an acid number of from about 25 to 75. It is also desirable to blanket the reaction with an inert gas, such as nitrogen, designed to prevent oxidation of the double bonds of the esterified fatty acids.

If desired, various relatively high boiling monohydric alcohols, such as tetrahydrofuryl alcohol, ethoxyethanol, methoxyethanol, etc. can be added to the reaction medium in order to reduce the acid value of the alkyd, and/or to impart more advantageous air-drying properties to the alkyd. However, their use is optional.

The resulting alkyd resin can be shipped as such to the ultimate user for formulating into a suitable paint or thinned with a cosolvent and/or dissolved in water at alkaline pH.

If the resulting alkyd resin is capable of dissolving in aqueous alkali without the aid of a cosolvent, it is dissolved directly into an aqueous alkaline medium wherein the alkaline pH is established by a basic material such as ammonia (or ammonium hydroxide), amines such as monoethyl amine, diethyl amine, triethyl amine, monoethanol amine, diethanol amine, triethanol amine, morpholine etc., alkali metal hydroxides such as sodium hydroxide, potassium hydroxide, etc.

In general it has been found that nitrogen containing bases such as ammonium hydroxide and amines tend to yield applied paint films which have more of a tendency to yellow than when an alkali metal hydroxide has been employed to establish the pH of the paint. On the other hand, ammonium hydroxide and amines tend to yield a somewhat more water-resistant coating more rapidly than when an alkali metal hydroxide has been employed.

In the event that the alkyd resin is incapable of dissolving in aqueous alkali without the aid of a cosolvent, the alkyd is first dissolved in a suitable coupling cosolvent before the system is rendered alkaline. Suitable coupling cosolvents include polar solvents such as ethylene glycol monomethyl ether, ethylene glycol monoethyl ether, ethylene glycol monopropyl ether, ethylene glycol monobutyl ether, ethylene glycol monoethyl ether acetate, propylene glycol monopropyl ether, diethylene glycol monomethyl ether, diethylene glycol monoethyl ether, diethylene glycol monopropyl ether, diethyleneglycol monobutyl ether, diethylene glycol monoethyl ether acetate, ethylene glycol, propylene glycol, hexyleneglycol, diethylene glycol, triethylene glycol, n-propanol, dioxane.

The following examples are merely illustrative and should not be construed as limiting the scope of the invention. The cloud point referred to in the examples was determined by starting with a high concentration of clear resin solution in a mixture of water at an alkaline pH and diluting with water until the appearance of haze. The cloud point is expressed as percent solids.

EXAMPLE I

Three hundred parts by weight safflower oil, 85.1 parts by weight trimethylol ethane and 0.6 part by weight lithium ricinoleate was disproportionated at 250° C. for 1 hour. Then 45.7 parts by weight dimethylol propionic acid, 36.7 parts by weight maleic anhydride and 96.2 parts by weight phthalic anhydride was added to the reaction mixture which was maintained at about 200° C. for five hours until the alkyd reached an acid number of 58. The alkyd was cooled and diluted with propoxypropanol to form a 70% solids composition. Sufficient aqueous ammonium hydroxide was added to adjust the pH to 8.1. This composition was infinitely dilutable with water, i.e. had no cloud point.

EXAMPLE II

Three hundred parts by weight safflower oil, 85.1 parts by weight trimethylol ethane and 0.6 part by weight lithium ricinoleate was disproportionated at 250° C. for one hour. Then 45.7 parts by weight dimethylol propionic acid, 60 parts by weight maleic anhydride (60 mole percent of polycarboxylic acids), and 60.7 parts by weight phthalic anhydride (40 mole percent of polycarboxylic acids) was added to the reaction mixture which was maintained at about 190° C. for three hours until the alkyd reached an acid number of 66. The alkyd was cooled and diluted with propoxypropanol to form a 70% solids composition. The alkyd had no cloud point.

EXAMPLE III

Three hundred parts by weight safflower oil, 28.3 parts by weight trimethylol ethane, 59.7 parts by weight dipentaerythritol and 0.6 part by weight lithium ricinoleate was disproportionated at 250° C. for one hour. Then 45.7 parts by weight dimethylol propionic acid, 10.5 parts by weight maleic anhydride (10 mole percent of polycarboxylic acids) and 136.5 parts by weight phthalic anhydride (90 mole percent of polycarboxylic acids) was added to the reaction mixture which was maintained at about 200° C. for five and one-half hours until the alkyd reached an acid number of 60. The alkyd was cooled and diluted with propoxypropanol to form a 70% solids composition. The alkyd had a cloud point at 23% solids.

When this example was repeated omitting maleic anhydride and increasing the phthalic anhydride content to 151.2 parts by weight the resulting alkyd had a cloud point at 29% solids.

EXAMPLE IV

Three hundred and fifty parts by weight safflower oil, 34.8 parts by weight dipentaerythritol, 66.0 parts by weight trimethylol ethane and 0.7 part by weight lithium ricinoleate was disproportionated at 250° C. for one hour. Then 53.3 parts by weight dimethylol propionic acid, 38.9 parts by weight itaconic acid and 132.6 parts by weight phthalic anhydride was added to the reaction mixture which was maintained at about 200° C. for seven hours until the alkyd reached an acid number of 51. The alkyd was cooled and diluted with propoxypropanol to form a 70% solids composition. The alkyd had a cloud point at 22% solids.

Since many embodiments of this invention may be made and since many changes may be made in the embodiments described, the foregoing is to be interpreted as illustrative only and my invention is defined by the claims appended hereafter.

I claim:

1. The process of forming a film-forming water-soluble alkyd resin which comprises reacting together under conditions simultaneously promoting adduct formation and esterification (1) the partial ester of a drying oil fatty acid and polyhydric alcohol having on an average at least 1.5 free hydroxyl groups per molecule, (2) an alpha, alpha-dimethylol monocarboxylic acid and (3) a polycarboxylic acid comprising from 10 to 60 mole percent of at least one alpha, beta-ethylenically unsaturated dicarboxylic acid with correspondingly from 90 to 40 mole percent being non-ethylenically unsaturated dicarboxylic acid wherein said partial ester of drying oil fatty acid comprises from 30 to 80% by weight of the alkyd, said alpha, alpha-dimethylol monocarboxylic acid comprises from about 0.1 to 1.0 moles per equivalent of fatty acid in said partial ester and said polycarboxylic acid comprises from about 1 to 4 equivalents per equivalent of fatty acid in said partial ester.

2. The method of claim 1 wherein said alpha, alpha-dimethylol monocarboxylic acid comprises dimethylol propionic acid.

3. The method of claim 1 wherein said reaction is carried out at a temperature of about 150 to 300° C. in the absence of diluent.

References Cited

UNITED STATES PATENTS

| 3,366,563 | 1/1968 | Hart et al. | 260—22 |
| 3,380,942 | 4/1968 | Menke | 260—22 |
| 2,275,843 | 3/1942 | Clocker | 260—22 |
| 2,941,968 | 6/1960 | McKenna | 260—22 |
| 3,345,313 | 10/1967 | Ruhf et al. | 260—22 |

DONALD E. CZAJA, Primary Examiner

R. W. GRIFFIN, Assistant Examiner

U.S. Cl. X.R.

117—167; 260—29.2, 32.4, 32.6, 33.2, 33.4